Sept. 10, 1957  P. L. CAMESCASSE  2,805,935
PROCESS FOR THE MANUFACTURE OF MAGNESIUM
Filed March 26, 1954
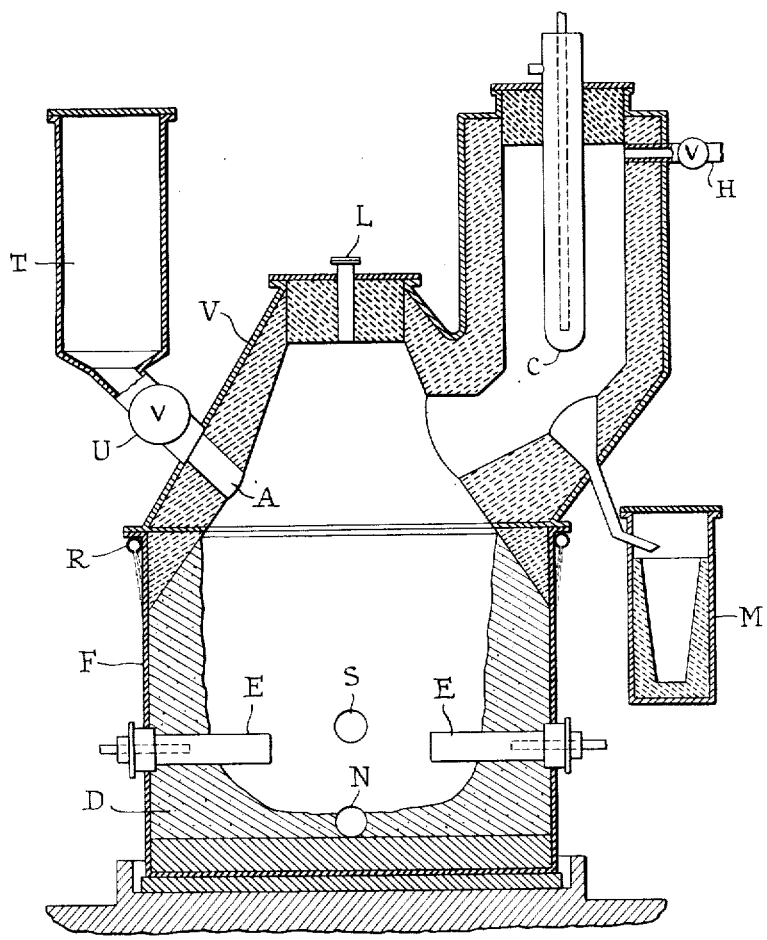
INVENTOR
Pierre L. Camescasse
BY
ATTORNEY

United States Patent Office

2,805,935
Patented Sept. 10, 1957

2,805,935

PROCESS FOR THE MANUFACTURE OF MAGNESIUM

Pierre L. Camescasse, Bagneres de Bigorre, France, assignor to Soberma (Societe de Brevets, d'Etudes et de Recherches pour le Magnesium), Paris, France, a corporation of France Application March 26, 1954, Serial No. 419,023

Claims priority, application France April 9, 1953

11 Claims. (Cl. 75—67)

The present invention is directed to an improved process for producing magnesium on an industrial scale. A preferred embodiment of the invention will be described with reference to the annexed drawing, wherein the single Figure 1 represents, in diagrammatic form, a vertical section of an apparatus for carrying out the present invention.

Magnesium can be obtained on an industrial scale by reducing at a high temperature magnesia, or a substance containing the same, by means of different compounds, such as silicon, aluminum, or calcium carbide. These reducing agents are relatively expensive.

Carbon can be used as a reducing agent, but the fact that the resultant product is in the gaseous state leads to great operating difficulties. Accordingly, it would be of great interest to this industry to be able to use a cheap reducing agent, the action of which would not lead to the formation of gaseous products.

The present invention, which is based upon applicant's researches, relates to a process for manufacturing magnesium by the action of iron, or of an alloy having a perdominant iron content, at a high temperature and under vacuum on a substance containing magnesium, in the presence of a metallic sulfide.

As the magnesium containing substances there can be used magnesium sulfide, in which case the following reaction is obtained:

$$MgS + Fe = FeS + Mg$$

However, it would be necessary to use such high temperatures and such low vacua that it would be difficult to carry out this reaction on an industrial scale. Furthermore, magnesium sulfide is not a common product.

A preferred embodiment of the invention consists in reacting iron-or an alloy having a predominant quantity of iron-in the presence of a metallic sulfide on magnesia or a substance containing the same. It is advantageous to use aluminum sulfide and, for example, calcined dolomite, in which case the following reaction is obtained:

(1)  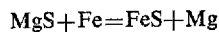
$$Al_2S_3 + 3Fe + 3(MgO.CaO) = Al_2O_3.3CaO + 3FeS + 3Mg$$

The reaction can be facilitated by adding a small proportion of a flux, such as one or more alkaline earth fluorides.

To facilitate the separation of the iron sulfide, and of the resultant calcium aluminate, there can be used in the reaction a proportion of iron in excess of the stoichiometric quantity so as to obtain a mixture of FeS and of Fe which is susceptible to magnetic separation.

In place of calcined dolomite, there can also be used a mixture of magnesia and dolomite, so as to obtain dicalcium aluminate, $Al_2O_3.2CaO$. The following examples will illustrate the application of the invention.

*Example I*

A mixture of 1 kg. of calcined dolomite containing 34% of MgO, and 714 grammes of aluminum sulfide containing 38% sulfur, and 635 grammes of cast iron filings are progressively heated to a temperature of 1300° C. and under a vacuum of 0.01 millimeter of mercury in the presence of a small quantity of calcium fluoride and magnesium fluoride. Crystals of pure magnesium are collected in the condenser associated with the heating apparatus.

It has been found that reaction (1) above is more complete when it is carried out in solid phase.

*Example II*

By reacting a mixture of aluminum sulfide, cast iron and calcined dolomite in the stoichiometric proportion indicated above, at a temperature of 1100 to 1150° C. and at a pressure of 0.01 to 0.005 millimeter of mercury, there is obtained a magnesium yield of 46%.

By using a lower pressure, for example 0.001 mm., even better results are obtained. However, the use of very low pressures on an industrial scale, makes it necessary to carry out the reactions in retorts of relatively small dimensions; accordingly, it has been attempted to improve the process still further.

By using ferro-silicon in lieu of iron, or of the cast iron, according to the reaction:

(2)  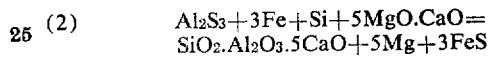
$$Al_2S_3 + 3Fe + Si + 5MgO.CaO = SiO_2.Al_2O_3.5CaO + 5Mg + 3FeS$$

it is possible to obtain a higher magnesium yield. A low ferro-silicon, for example, one with a 15% silicon content can be used.

*Example III*

The following mixture is agglomerated together, for example, by tabletting:

|  | Kgs. |
|---|---|
| Aluminum sulfide | 150 |
| Ferro silicon having 15% silicon | 200 |
| Calcined dolomite having 30% MgO | 480 |
| Magnesia having 90% MgO | 56 |
| Fluorspath | 44 |
|  | 930 |

The mixture is heated to a temperature of 1250–1300° C. at an absolute pressure of 0.005 to 0.01 millimeter of mercury.

100 kgs. of magnesium crystals are collected in the condenser, that is, a yield of about 80%.

*Example IV*

In this embodiment of the invention there is used continuously operating furnace, as shown in the drawing. In this drawing, F is the furnace casing which is cooled externally by water circulation at R, thereby producing a self-lining D. The electric current for heating is supplied by the graphite electrodes E which are constantly immersed in a liquid slag of silico-aluminate of lime resulting from the previous operation.

The cover V of the furnace is provided with an observation opening L enabling the measurement of the slag temperature, and with condensation chamber containing a water-cooled condenser C. A pipe H connects the condensing chamber to the vacuum pump.

With a power supply of 250 to 300 kw., the daily charge is:

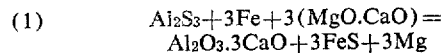

|  | Kgs. |
|---|---|
| Aluminum sulfide | 300 |
| Iron | 340 |
| Ferro-silicon having 26% Si | 230 |
| Calcined dolomite having 33% MgO | 760 |
| Magnesia having 90% MgO | 112 |
|  | 1742 |

Following grinding, the constituents of the charge are intimately mixed and tabletted. The resultant tablets are charged into the trough T and are introduced into the furnace through the openings A by manipulating the valve U. When the slag attains a temperature of about 1600° C. and a pressure of 2 to 10 millimeters of mercury, about 174 kgs. of the mixture are dropped on to the surface of the slag.

When contacted by the charge a thin layer of the slag solidifies and the reaction leading to the production of magnesium takes place in solid phase. The magnesium condenses at C in liquid condition and drops into the container M from which it is periodically removed (collected). When the temperature of the slag again attains approximately 1600° C., a new charge is dropped in and the operation is repeated. When the quantity of slag increases too much, the excess is removed through the orifice S and the excess iron, which retains a portion of the iron sulfide formed by the reaction, is removed through the lower pouring opening N in the hearth.

About 200 kgs. of magnesium are collected daily, that is, a yield of about 80%.

While the two reagents employed in the reduction of the dolomite, that is, the aluminum sulfide and the iron, are relatively cheap substances in comparison with silicon and aluminum, it has nevertheless been found advantageous to recover the iron sulfide obtained as by-product and to use it in the manufacture of further quantities of reagents, according to the known equation:

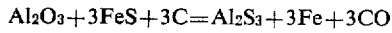
$$Al_2O_3 + 3FeS + 3C = Al_2S_3 + 3Fe + 3CO$$

In this reaction natural alumina can be used, according to known techniques, in the form of bauxite where the alumina is principally associated with oxides of iron and silicon.

The quantity of carbon employed during the manufacture of the aluminum sulfide $Al_2S_3$ should be sufficient to reduce also the iron oxide and the silica. It is not necessary to obtain a complete sulfidizing of the alumina because a mixture of $Al_2S_3$ and of $Al_2O_3$ can be used for the manufacture of magnesium.

Having thus employed the produced iron sulfide for reforming the aluminum sulfide required for the reaction, the other by-product, namely the calcium aluminate or the silico-aluminate of calcium, can likewise be employed usefully. The calcium aluminate can be used either in the manufacture of aluminum cements or in the manufacture of alumina. The silico-alumina of lime can be used as an addition in the manufacture of cements.

The term "iron" as used in the appended claims includes iron per se, cast iron, and other alloys of iron containing a predominant quantity of iron.

I claim:

1. Process for producing magnesium comprising the step of: reacting at a temperature within the range of 1100°–1650° C. and a pressure within the range of 0.0001–10 mm. Hg, a magnesium-containing compound with iron and a metallic sulfide other than iron sulfide.

2. A process for producing magnesium comprising the step of reacting at a temperature within the range of 1100°–1650° C. and a pressure within the range of 0.0001–10 mm. Hg, a magnesium-containing compound with iron and aluminum sulfide.

3. A process according to claim 2 in which the magnesium containing compound is selected from the group consisting of calcined dolomite, magnesia and mixtures thereof.

4. A process according to claim 2, characterized in that the reaction is carried in solid phase within a temperature range of 1100–1150° C. and a pressure within the range of 0.0001–0.01 mm. mercury, and that magnesia is reacted with one of the substances selected from the group consisting of iron and cast iron.

5. A process according to claim 2, further characterized in that iron is reacted in the presence of silicon at a temperature of 1250–1300° C. and at a pressure of 0.005 to 0.1 mm. of mercury.

6. Process according to claim 2 further characterized by the use of a flux comprising an alkaline earth fluoride.

7. Process according to claim 2 further characterized by the use of a quantity of iron in excess of the stoichiometric proportion, whereby the separation of the resultant iron sulfide is enhanced.

8. Process according to claim 2, characterized by the further steps of: separating the resultant iron sulfide from the reaction mass; reacting the separated sulfide with an aluminum-containing substance in the presence of carbon to form aluminum sulfide; recovering the aluminum sulfide and using it to treat further quantities of the magnesium-containing compound as described.

9. Process for producing magnesium comprising the steps: forming a reaction mixture comprising a magnesium-containing compound, iron, silicon and aluminum sulfide, successively contacting in a reaction zone a quantity of said mixture with the surface of a molten slag formed as described hereinafter, the quantity of mixture added at any one time being such that the slag solidifies upon contact with the reaction mixture and that the reaction leading to the formation of magnesium and a silico-aluminum slag takes place in the solid phase; recovering the magnesium so formed; heating the slag to a temperature of about 1650° C. at a pressure ranging from 2 to 10 mm. of mercury to melt the solidified slag; and adding further quantities of reaction mixture to form additional quantities of magnesium.

10. A process according to claim 9 characterized by the further step of removing excess slag from the reaction zone.

11. Process for producing magnesium comprising the steps of reacting at a temperature within the range of 1100°–1650° C. and a pressure within the range of 0.0001–10 mm. Hg, a magnesium-containing compound with iron and a metallic sulfide to thereby produce, as a result of the reaction, metallic magnesium and iron sulfide, and separating and recovering the metallic magnesium from the reaction products.

References Cited in the file of this patent

FOREIGN PATENTS 506,485    Great Britain _____ May 30, 1939

UNITED STATES PATENT OFFICE

CERTIFICATE OF CORRECTION

Patent No. 2,805,935 September 10, 1957

Pierre L. Camescasse

It is hereby certified that error appears in the printed specification of the above numbered patent requiring correction and that the said Letters Patent should read as corrected below.

Column 2, line 16, for "0.001 mm." read --0.0001 mm.--.

Signed and sealed this 22nd day of October 1957.

(SEAL)
Attest:

KARL H. AXLINE
Attesting Officer

ROBERT C. WATSON
Commissioner of Patents